US011082567B2

(12) United States Patent
Hill et al.

(10) Patent No.: US 11,082,567 B2
(45) Date of Patent: Aug. 3, 2021

(54) ROTATABLE SCANNER IMAGE SENSORS WITHIN SEALED ENCLOSURES

(71) Applicant: Hewlett-Packard Development Company, L.P., Spring, TX (US)

(72) Inventors: Edward Anthony Hill, San Diego, CA (US); Craig T Johnson, San Diego, CA (US); Ryan M Smith, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/769,366

(22) PCT Filed: Jan. 31, 2018

(86) PCT No.: PCT/US2018/016259
§ 371 (c)(1),
(2) Date: Jun. 3, 2020

(87) PCT Pub. No.: WO2019/152024
PCT Pub. Date: Aug. 8, 2019

(65) Prior Publication Data
US 2021/0185180 A1 Jun. 17, 2021

(51) Int. Cl.
H04N 1/00 (2006.01)
H04N 1/028 (2006.01)
H04N 1/031 (2006.01)

(52) U.S. Cl.
CPC ..... *H04N 1/00087* (2013.01); *H04N 1/00018* (2013.01); *H04N 1/00031* (2013.01);
(Continued)

(58) Field of Classification Search
CPC .... H04N 1/0281; H04N 1/031; H04N 1/0311; H04N 1/0312; H04N 1/0314; H04N 1/0318; H04N 1/00013; H04N 1/00018; H04N 1/00034; H04N 1/00045; H04N 1/00087
See application file for complete search history.

(56) References Cited

U.S. PATENT DOCUMENTS 4,967,233 A * 10/1990 Buchar ............... H04N 1/0311
358/496
7,099,052 B2 8/2006 Chang et al.
(Continued)

FOREIGN PATENT DOCUMENTS

EP 0751666 A2 1/1997
JP S63136280 A 6/1988
(Continued)

*Primary Examiner* — Scott A Rogers
(74) *Attorney, Agent, or Firm* — Perry + Currier

(57) ABSTRACT

An example scanner device includes a sealed enclosure including a scan window to allow light to enter the sealed enclosure, and an optical assembly including a light source and an image sensor. The light source is to emit light through the scan window onto a medium to be scanned. The image sensor is to capture light reflected by the medium through the scan window. The optical assembly is rotatably positioned within the sealed enclosure. An actuator is disposed within the sealed enclosure to rotate the optical assembly to aim the optical assembly at different locations on the scan window.

15 Claims, 6 Drawing Sheets

(52) U.S. Cl.
CPC ....... *H04N 1/00034* (2013.01); *H04N 1/0281* (2013.01); *H04N 1/0312* (2013.01); *H04N 1/0314* (2013.01); *H04N 1/0318* (2013.01)

(56) References Cited

U.S. PATENT DOCUMENTS

| | | |
|---|---|---|
| 7,391,538 B2 | 6/2008 | Lien |
| 7,466,457 B2 | 12/2008 | Chen |
| 7,903,299 B2 | 3/2011 | Ku et al. |
| 8,830,535 B2 | 9/2014 | Tu et al. |
| 2011/0141535 A1 | 6/2011 | Westcott et al. |
| 2011/0157656 A1 | 6/2011 | Liao |

FOREIGN PATENT DOCUMENTS

| | | |
|---|---|---|
| JP | H04207853 A | 7/1992 |
| JP | 2007013625 | 1/2007 |
| WO | WO-2015178918 A1 | 11/2015 |

\* cited by examiner

ROTATABLE SCANNER IMAGE SENSORS WITHIN SEALED ENCLOSURES

BACKGROUND

Scanners are used to obtain images from documents. Flatbed scanners typically hold a document to be scanned stationary while moving an image sensor across the document. Automatic document feeder (ADF) scanners typically convey documents past a stationary image sensor.

DETAILED DESCRIPTION

Streaks and other image errors may appear in scanned images. Streaks may be caused by dust, debris, particulate, or other foreign matter that is located on a scan window or between the scan window and the document being scanned. A streak may also be caused by foreign matter that is located in front of a calibration strip used to calibrate the scanner prior to scanning a document.

A scanner device may include an optical assembly located within a sealed enclosure. The sealed enclosure may have a scan window through which the optical assembly can scan a document, which may be delivered by a sheet feeder mechanism. An actuator may be provided to the sealed enclosure to slightly rotate the optical assembly to change its target scan line on a calibration strip or on a document. When detecting foreign matter that may potentially cause a streak or similar image error, the optical assembly may be rotated slightly to avoid scanning the foreign matter. Locating the optical assembly within the sealed enclosure and behind the scan window keeps foreign matter away from the optical assembly, so that rotation of the optical assembly may be used to compensate for foreign matter outside the sealed enclosure.

Figure 1:
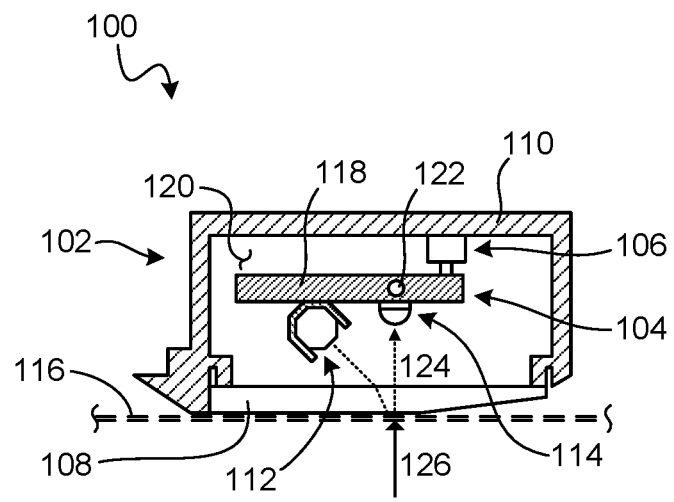
FIG. 1 is a cross-sectional side view of an example scanner device including an example rotatable optical assembly inside an example sealed enclosure.

FIG. 1 shows an example scanner device 100. The scanner device 100 may be used to capture images of media, such as paper documents, that are moved past a scan window. The scanner device 100 may be used to capture images a calibration strip. The scanner device 100 may be a scan module, such as the kind used in automatic document feeder (ADF) scanners. An ADF scanner may be a stand-alone scanner or may be implemented in a printer, multi-function device, or other device.

The scanner device 100 includes a sealed enclosure 102, an optical assembly 104, and an actuator 106.

The sealed enclosure 102 includes a scan window 108 to allow light to enter the sealed enclosure 102. The scan window 108 may be made of glass or similar translucent or transparent material. The scan window 108 may be generally planar and may be positioned on one side of the sealed enclosure 102. The remainder of the sealed enclosure 102 may include a housing 110 that is impermeable to light or opaque. The scan window 108 may be attached and sealed to the housing 110 by an adhesive, a gasket and mechanical fasteners, and/or similar. The sealed enclosure 102 may be sealed against the intrusion of foreign matter but need not be hermetically sealed. A through-hole in the sealed enclosure 102 for mechanical communication, such as for a drive device for an actuator, or for electrical communication, such as for a power/data line for the optical assembly 104, may be sealed by a sealing element such as various types of gaskets.

The optical assembly 104 includes a light source 112 and an image sensor 114. The image sensor 114 may be a linear image sensor or an array of image sensors that spans a width (in a direction into the page in FIG. 1) of a medium 116 to be scanned. The light source 112 may be a linear light source, such as a florescent tube, an array of light sources, such as a series of light emitting diodes (LEDs), or a light guide with a point light source or sources. The light source 112 may span the width of the medium 116. The light source 112 is to emit light through the scan window 108 onto the medium 116 to be scanned. The image sensor 114 is to capture light reflected by the medium 116 through the scan window 108, as the medium 116 is moved past the scan window 108. A lens or array of lenses, such as a rod lens array, may be provided to focus light on the image sensor 114. The optical assembly 104 may be a contact image sensor (CIS).

The optical assembly 104 is rotatably positioned within the sealed enclosure 102. The light source 112 and the image sensor 114 may be disposed on a member 118 that is rotatably connected to a wall 120 of the sealed enclosure 102. The member 118 may be connected to the wall 120 by a pivot connection 122. The pivot connection 122 may fix the optical assembly 104 against translation with respect to the sealed enclosure 102. That is, the optical assembly 104 may be rotatable and held against linear movement within the sealed enclosure 102. A range of rotational motion of the optical assembly 104 may be constrained by redefine limits. The pivot connection 122 may provide an axis of rotation that is coincident, or close to coincident, with the image sensor 114. In other examples, the pivot connection 122 may be distant from the image sensor 114.

A light path 124 may extend from the light source 112 through the scan window 108. The light path 124 may reflect from the medium 116 to be scanned at a scan line 126, back through the scan window 108, and to the image sensor 114. The example light path 124 illustrated is perpendicular to the scan window 108 and directly incident to the image sensor 114.

The actuator 106 is disposed within the sealed enclosure 102. The actuator 106 is to rotate the optical assembly 104 about the pivot connection 122 to aim the optical assembly 104 at different locations on the scan window 108. The actuator 106 may be connected to a motor, solenoid, or other drive device to drive the actuator 106. The drive device may be external to the sealed enclosure 102. In other examples, the actuator 106 may include the drive device inside the sealed enclosure 102. The actuator 106 may include a bias element, such as a spring, to bias the optical assembly 104 to a particular orientation.

Figure 2:
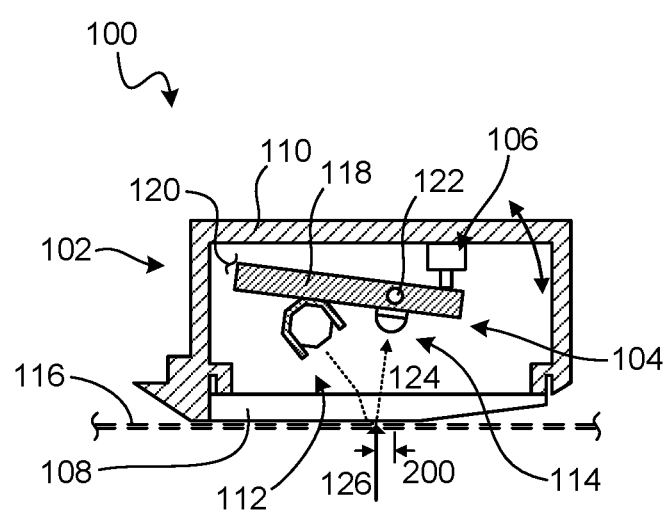
FIG. 2 is a cross-sectional side view of the example scanner device of FIG. 1 with the example rotatable optical assembly rotated to a different orientation.

FIG. 2 shows the actuator 106 controlling the optical assembly 104 to rotate to a different orientation compared to the orientation shown in FIG. 1. The light path 124 formerly perpendicular to the scan window 108 is now at an angle with respect to the scan window 108. Rotation of the optical assembly 104 moves the scan line 126 parallel to a direction of travel of a medium 116 to be scanned. The rotation of the optical assembly 104 may be constrained to limit a distance 200 between scan line locations on the medium 116, defined by the example light path 124, to be no greater than 1 mm. That is, the optical assembly 104 may be rotated to position its scan line 126 at different locations of the medium 116, and such locations may be constrained to be no more than 1 mm apart. Limiting the distance 200 to 1 mm may reduce or prevent distortion in the scanned image, which may result from a change to a relatively short focal length, such as a focal length provided by a rod lens array. Other example limits to the distance 200 may be determined based on specific implementations of the optical assembly 104 and the thickness of the scan window 108. The rotational range of the optical assembly 104 may be constrained by a physical stop that the optical assembly 104 abuts against, by a limit in the actuator 106, or similar structure or mechanism.

When foreign matter is detected at a scan line 126, then the optical assembly 104 may be rotated to position the scan line 126 at a different location. For example, during a calibration of the scanner device 100, a medium 116 to be scanned may be a calibration strip, such as a linear strip of material having a known color (e.g., white). If foreign matter is present at the scan line 126, then the calibration may be inaccurate. As such, the optical assembly 104 may be rotated within the sealed enclosure 102 to position the scan line 126 at a different location to provide an accurate calibration.

Figure 3:
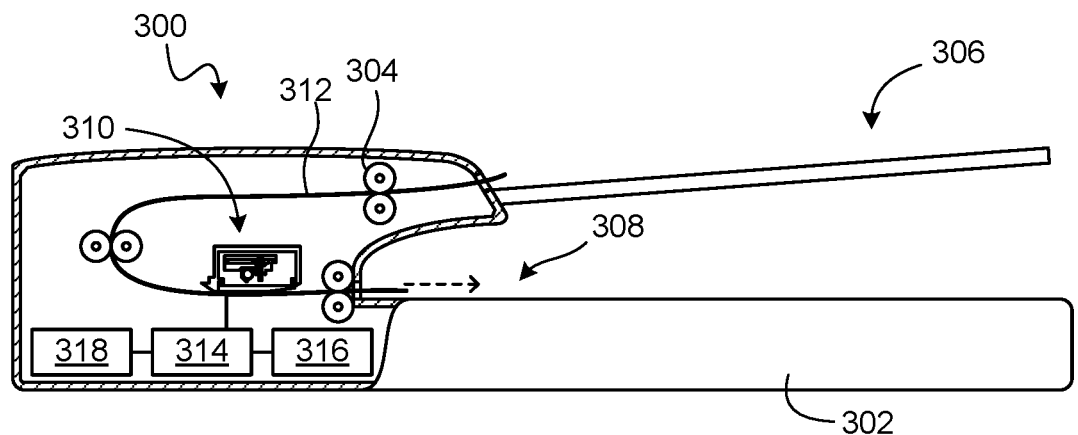
FIG. 3 is a partial cross-sectional side view of another example scanner device including an example scan module.

FIG. 3 shows an example scanner device 300. The device 300 is similar to the other devices described herein and description of the other devices may be referenced. Like reference numerals denote like components. Features and aspects of the other devices described herein may be used with the device 300.

The scanner device 300 includes a housing 302, a media transport mechanism 304, an input tray 306, an output tray 308, and a scan module 310. The scanner device 300 may be an ADF scanner. The scan module 310 may be a device, such as those described elsewhere herein, and is fixed within the housing 302.

The media transport mechanism 304 may include rollers, such as a drive roller, a feed roller, a pick roller, a separation roller, a pre-scan roller, a post-scan roller, paper guides, and/or similar to convey a medium 312 to be scanned, such as paper, from the input tray 306, past the scan module 310, and to the output tray 308.

The scanner device 300 further includes a processor 314, memory 316, and a data interface 318. The processor 314 is connected to the scan module 310 to control the scan module 310 according to instructions stored in the memory 316. The memory 316 may store scanned images/data.

The processor 314 may include a central processing unit (CPU), a graphics processing unit (GPU), a microcontroller, a microprocessor, a processing core, a field-programmable gate array (FPGA), or similar device capable of executing instructions. The processor 314 may cooperate with the memory 316 to execute instructions. The memory 316 may include a non-transitory machine-readable storage medium that may be an electronic, magnetic, optical, or other physical storage device that stores executable instructions. The machine-readable storage medium may include, for example, random access memory (RAM), read-only memory (ROM), electrically-erasable programmable read-only memory (EEPROM), flash memory, a storage drive, an optical disc, and the like. The machine-readable storage medium may be encoded with executable instructions.

The data interface 318 may provide input/output functionality. The data interface 318 may include a user interface though which a user may input commands for the processor 314 to perform. The user interface may include a display device for the processor 314 to provide information to the user. The data interface 318 may include a communications interface, such as a wired or wireless network adaptor, though which a computer device may provide commands for the processor 314 to perform. The communications interface may convey scanned images/data to a computer device.

Figure 4:
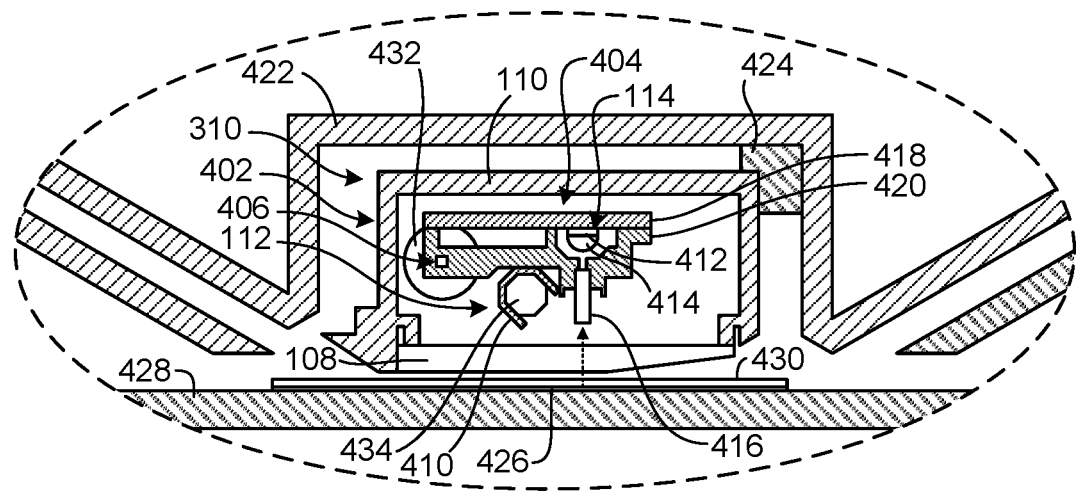
FIG. 4 is a cross-sectional side view of the scan module of FIG. 3 showing an example rotatable optical assembly.

As shown in FIG. 4, the scan module 310 may include a sealed enclosure 402, an optical assembly 404, and an actuator 406.

The sealed enclosure 402 may include a scan window 108 to allow light to enter the sealed enclosure 102. The sealed enclosure 402 may include an opaque housing 110 to secure and seal the scan window 108.

The optical assembly 404 may include a light source 112 and an image sensor 114. The light source may include an illumination device 434, such as a florescent tube, an array of LEDs, or a light guide with a point light source or sources, and a reflector 410 to direct light towards the scan window 108. The image sensor 114 may include an imaging device 412, such as an array of photodiodes and color filters, and a lens 414, such as a rod lens positioned in front of the image sensor 114. The optical assembly 404 may further include a lens or lens array 416, such as a rod lens array, positioned between the image sensor 114 and the scan window 108.

The optical assembly 404 may further include a substrate 418, such as a printed circuit board (PCB) or printed circuit board assembly (PCBA), that may carry the image sensor 114 and supporting circuitry, and a body 420 to secure the light source 112, rod lens array 416, and substrate 418 together. The optical assembly 404 may be coupled to the processor 314 to communicate data, such as scanned images, with the processor 314. A wire or set of wires may extend through the sealed enclosure 402 to connect the optical assembly 404 to the processor 314 and the through-hole may be sealed with a sealing element such as various types of gaskets, glue, or other material.

The optical assembly 404 is connected to the actuator 406 to be rotatably actuatable within the sealed enclosure 402. In this example, the body 420 of the optical assembly 404 is connected to the actuator 406. In other examples, the substrate 418 or another component of the optical assembly 404 may be connected to the actuator 406.

The sealed enclosure 402 of the scan module 310 may be affixed to a frame 422 the scanner device 300 (FIG. 3). The frame 422 may be part of the housing 302 of the scanner device 300. A securement structure 424 may affix the scan module 310 to the frame 422 to constrain the sealed enclosure 402 against translation and rotation.

The scanner device 300 may further include a calibration strip 426 located outside the sealed enclosure 402. The light source 112 may emit light through the scan window 108 onto the calibration strip 426 when a medium to be scanned, such as paper, is absent. The image sensor 114 may capture light reflected by the calibration strip 426 through the scan window 108 via the rod lens array 416.

The scanner device 300 may further include a base 428 to guide a medium to be scanned into close proximity or contact with the scan window 108. The scanner device 300 may further include a calibration strip window 430 positioned opposite the scan window 108. The calibration strip 426 may be sandwiched between the base 428 and the calibration strip window 430. The calibration strip 426 may be a film or coating that is deposited on the calibration strip window 430.

The scanner device 300 may further include a motor 432 or other drive device. The motor 432 may be located inside the sealed enclosure 402. The motor 432 may be connected to the actuator 406 to drive the actuator 406 to controllably rotate the optical assembly 404 within the sealed enclosure 402. The actuator 406 may include a shaft that connects the optical assembly 404 to the motor 432.

Figure 5:
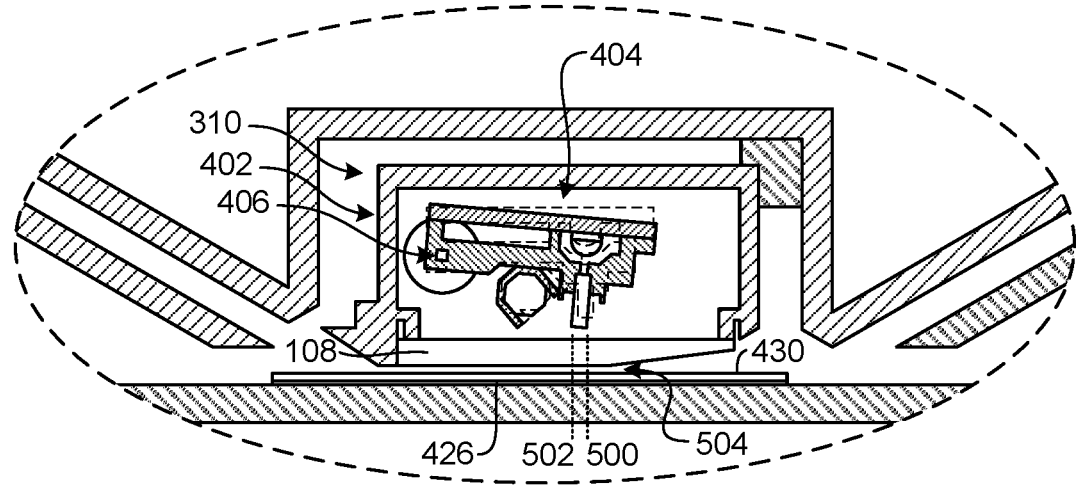
FIG. 5 is a cross-sectional side view of the scan module of FIG. 3 showing the example rotatable optical assembly rotated to a different orientation.

FIG. 5 shows the scan module 310 with the optical assembly 404 rotated by the actuator 406 to a different orientation with respect to the orientation shown in FIG. 4. The sealed enclosure 402 remains stationary. The optical assembly 404 may aim in different directions to provide different scan lines 500, 502 at different locations. The different scan lines 500, 502 are provided to a conveyed medium to be scanned or to the calibration strip 426 when such medium is absent from the light path. Different portions of the calibration strip 426 may be scanned to provide for an accurate calibration and account for foreign matter that may be present on the calibration strip 426, on the scan window 108, and/or on the calibration strip window 430. After calibration, the orientation may remain as actuated, shown in FIG. 5, or may be returned to the initial orientation shown in FIG. 4. A medium may then be conveyed through a gap 504 between the scan window 408 and the calibration strip window 430. and the optical assembly 404 may be controlled to scan the medium to capture an image and apply the calibration to the scanned image.

Figure 6:
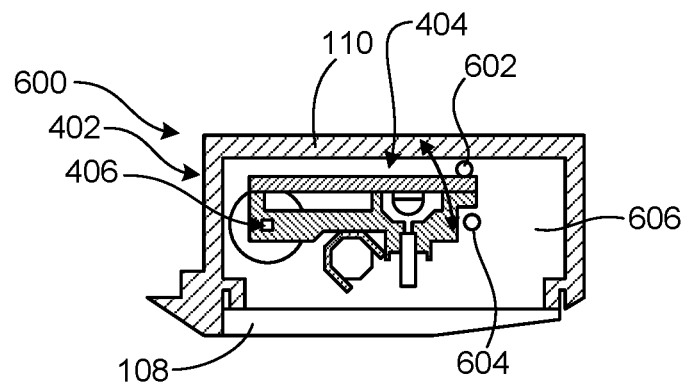
FIG. 6 is a cross-sectional side view of an example scanner device including an example rotatable optical assembly inside an example sealed enclosure with example rotational limit stops.

FIG. 6 shows an example scanner device 600. The device 600 is similar to the other devices described herein and description of the other devices may be referenced. Like reference numerals denote like components. Features and aspects of the other devices described herein may be used with the device 600. The scanner device 600 may be a scan module, such as a contact image sensor (CIS) module.

The scanner device 600 may include rotational limit stops 602, 604. The rotational limit stops 602, 604 may include protrusions that extend from an interior surface 606 of a sealed enclosure 402. The rotational limit stops 602, 604 may be positioned to block rotation of an optical assembly 404 located within the sealed enclosure 402 to limit the rotation of the optical assembly 404 by an actuator 406.

Figure 7:
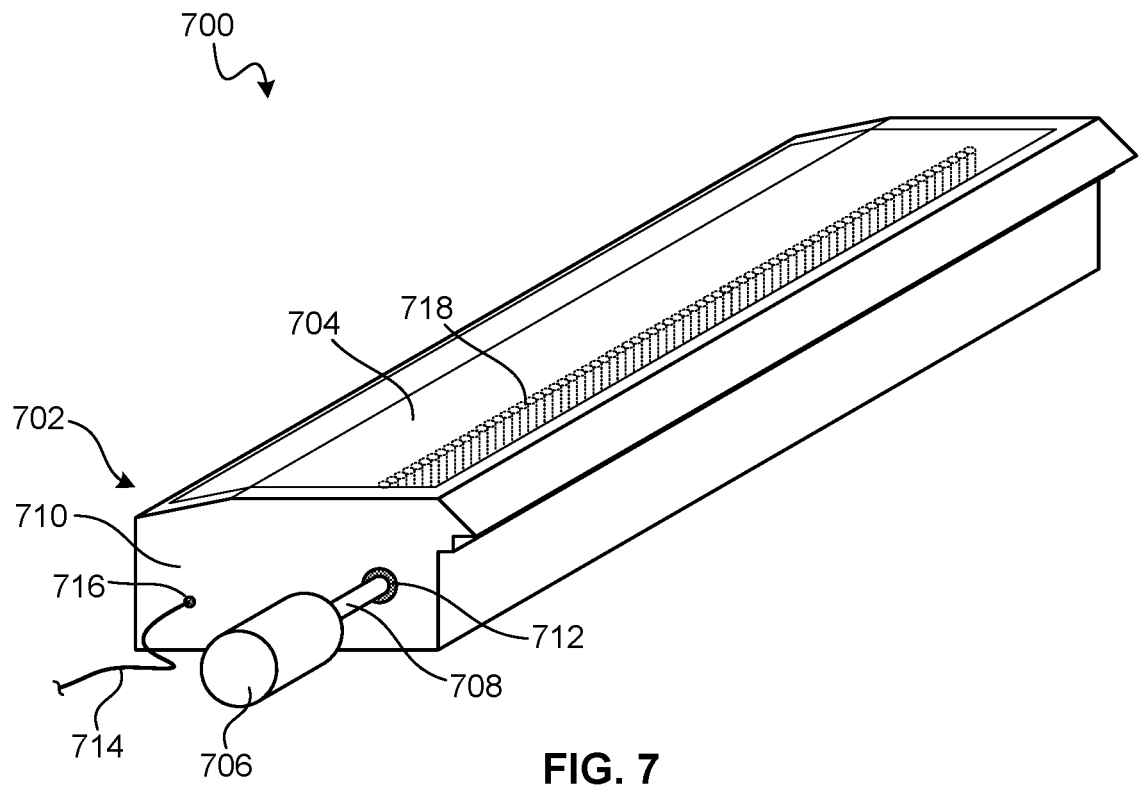
FIG. 7 is a perspective view of an example scanner device including an example exterior drive device to rotate an example rotatable optical assembly inside an example sealed enclosure.

FIG. 7 shows an example scanner device 700. The device 700 is similar to the other devices described herein and description of the other devices may be referenced. Like reference numerals denote like components. Features and aspects of the other devices described herein may be used with the device 700. The scanner device 700 may be a scan module, such as a CIS module.

The scanner device 700 includes a sealed enclosure 702 containing an optical assembly, such an optical assembly as described elsewhere herein, as represented by a rod lens array 718. The sealed enclosure 702 includes a scan window 704 through which the optical assembly may scan media, such as paper, a calibration strip, and similar. An actuator may be provided within the sealed enclosure 702 to rotate the optical assembly, as discussed elsewhere herein, to selectively position a scan line to avoid scanning foreign matter.

A drive device 706, such as a motor or solenoid, is disposed outside the sealed enclosure 702. The drive device 706 is connected to the actuator within the sealed enclosure 702 to drive the actuator to rotate the optical assembly within the sealed enclosure 702.

The drive device 706 may be connected to the actuator within the sealed enclosure 702 by a member 708, such as a shaft or rod. The member 708 may be rotatable, translatable, or both rotatable and translatable depending on the implementation of the actuator and drive device 706. The member 708 may penetrate a wall 710 of the sealed enclosure 702 to connect the drive device 706 to the actuator inside the sealed enclosure 702. A sealing element 712 that permits movement, such as an O-ring, may be provide around the member 708 where the member 708 penetrates the wall 710 to maintain the seal of the sealed enclosure 702 against the intrusion of foreign matter.

A wire 714 to connect to the optical assembly within the sealed enclosure 702 for communication of power or data may pass through an opening in a wall 710 of the sealed enclosure 702. Such an opening may be sealed by a sealing element 716, such as an O-ring, portion of glue, or similar.

Figure 8:
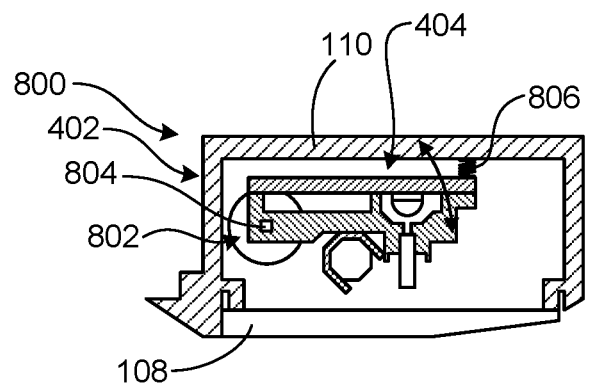
FIG. 8 is a cross-sectional side view of an example scanner device including an example rotatable optical assembly inside an example sealed enclosure with an example bias element.

FIG. 8 shows an example scanner device 800. The device 800 is similar to the other devices described herein and description of the other devices may be referenced. Like reference numerals denote like components. Features and aspects of the other devices described herein may be used with the device 800. The scanner device 800 may be a scan module, such as a CIS module.

The scanner device 800 includes an actuator 802 to rotate an optical assembly 404 within a sealed enclosure 402 to position a scan line at different locations relative to a scan window 108. The actuator 802 may include an axis of rotation 804 about which the optical assembly 404 rotates. The axis of rotation 804 may be defined by a shaft, rod, or similar member connected to a motor, solenoid, or similar drive device, which may be located inside or outside the sealed enclosure 402. The actuator 802 may further include a bias element 806 to bias the optical assembly 404 to a particular rotational orientation. When the optical assembly 404 is in an initial orientation and the actuator 802 is driven, the optical assembly 404 may rotate to a new orientation. When the driving impulse to the actuator 802 is removed, the bias element 806 may cause the optical assembly 404 to return to the initial orientation. The bias element 806 may be a spring, such as a coil spring, leaf spring, torsional spring, or similar. The bias element 806 may connect the optical assembly 404 to the sealed enclosure 402, as shown, or may be internal to an actuator 802, such as a spring-loaded solenoid.

Figure 9:
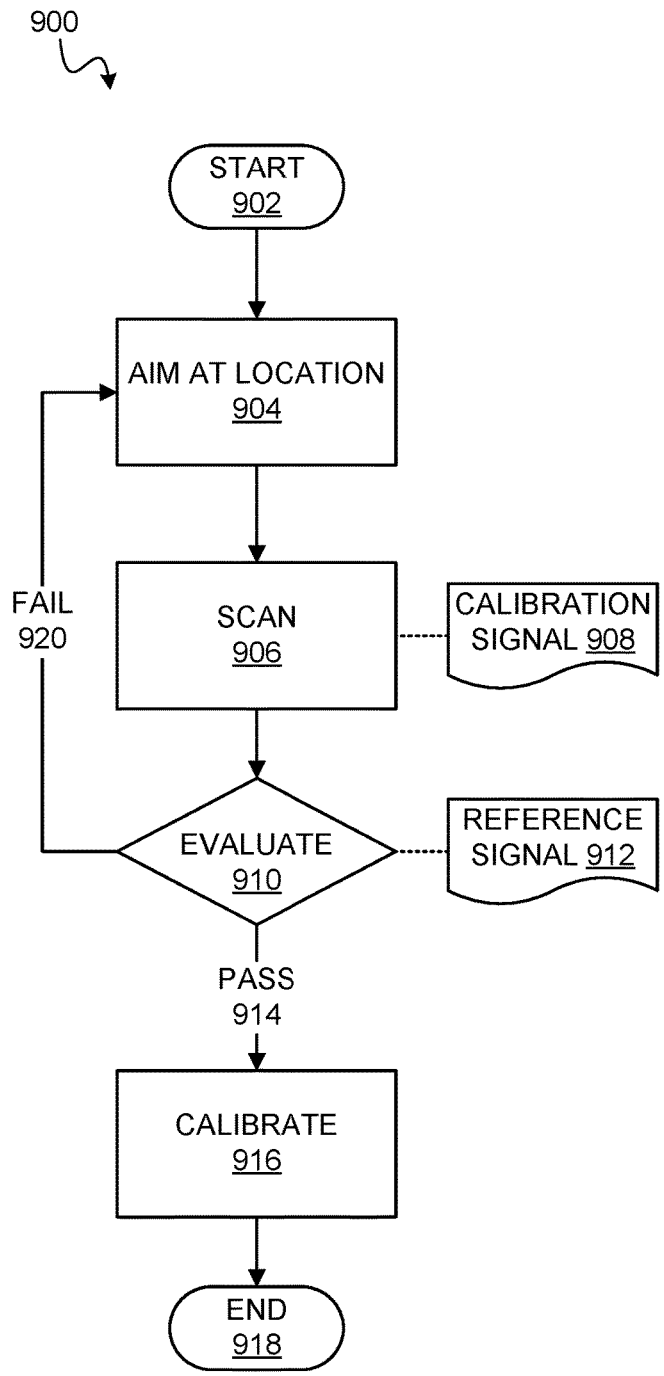
FIG. 9 is flowchart of an example method to operate a scanner device including evaluating a calibration signal to perform a calibration.

FIG. 9 shows a flowchart of an example method 900. The method 900 may be performed with any of the devices discussed herein. The method 900 may be implemented by processor-executable instructions. The method begins at block 902.

At block 904, a linear image sensor is oriented such that a capture light path of the image sensor is aimed at a location on a calibration strip. Aiming the image sensor may include aiming the image sensor through a scan window of a sealed enclosure that contains the image sensor. Aiming the image sensor may include driving an actuator.

At block 906, the location is scanned and light may be captured from the light path through the scan window of the sealed enclosure. Captured light may be taken as a calibration signal 908. The calibration signal 908 may represent intensity, color, and/or other property of captured light along the length of the image sensor.

At block 910, the calibration signal 908 may be evaluated against a reference signal 912 or other criterion. The reference signal 912 may indicate a required consistency of the calibration signal 908 along the length of the image sensor. The reference signal 912 may be expressed as an allowable deviation of the calibration signal from an average of the calibration signal, an allowable envelope for the calibration signal, or similar.

In other examples, light may be captured from an area of a medium, such as a document page or calibration strip, to obtain a calibration signal 908 that may be used to identify discontinuities or relative changes over the area. The calibration signal 908 may be a two-dimensional array of intensities, color, and/or other property. A smoothness of such a calibration signal 908 may be evaluated against a criterion, such as a maximum slope. A reference signal may not be required to evaluate smoothness of a calibration signal 908.

When the calibration signal 908 accords with the criterion by, for example, the calibration signal 908 having no value that deviates significantly from a reference signal 912, the calibration signal 908 passes 914 and the image sensor is calibrated using the calibration signal 908, at block 916, and the method ends, at block 918. A document may then be scanned and the calibration signal may be used to generate a calibrated scanned image from the document.

When it is determined, at block 910, that the calibration signal 908 fails 920 to accord with the criterion, the image sensor is rotated in response to aim at a different location on the calibration strip, at block 904. The method 900 then repeats until a location on the calibration strip free provides a calibration signal that passes. This may be considered a location at the calibration strip that is not affected by foreign matter. The method 900 may be performed for first, second, third, etc. locations on the calibration strip until a passing calibration signal 908 is obtained.

Figure 10:
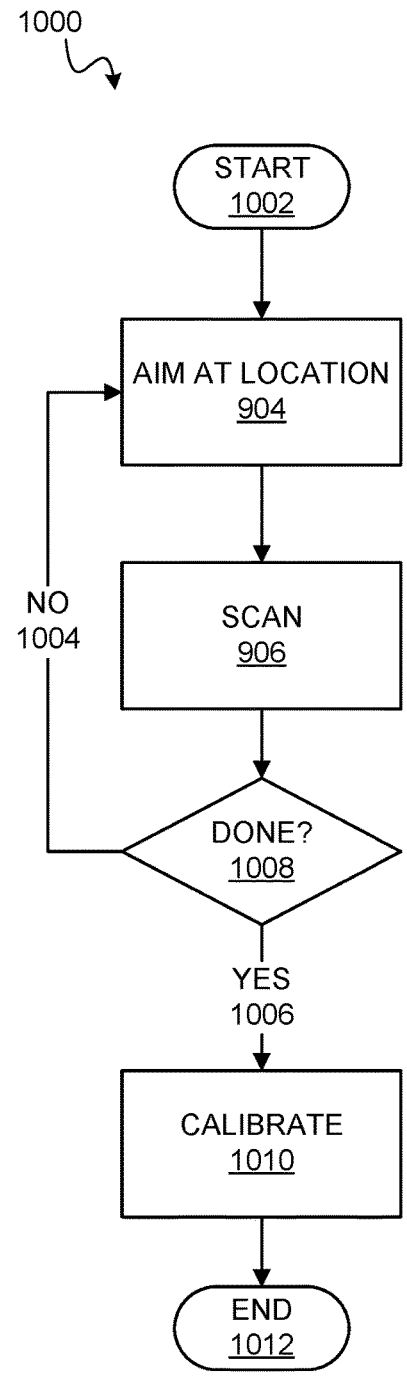
FIG. 10 is flowchart of an example method to operate a scanner device including averaging calibration signals to perform a calibration.

FIG. 10 shows a flowchart of an example method 1000. The method 1000 may be performed with any of the devices discussed herein. The method 1000 may be implemented by processor-executable instructions. The description of the method 900 may be referenced for description not repeated here, with like reference numerals denoting like components. The method begins at block 1002.

A calibration strip may be scanned to obtain calibration signals at different locations on the calibration strip as controlled by different orientations of an image sensor, at blocks 904 and 906. Block 904 and 906 may be repeated any number of times via path 1004 until it is determined 1006 that a number of calibration signals has been obtained, via block 1008.

At block 1010, the calibration signals may be combined to calibrate the image sensor. The calibration signals may be averaged to determine an average calibration signal to calibrate the image sensor. An outlier calibration signal may be discarded.

The method ends, at block 1012, and a document may then be scanned and the calibration signal may be used to generate a calibrated scanned image from the document.

Figure 11:
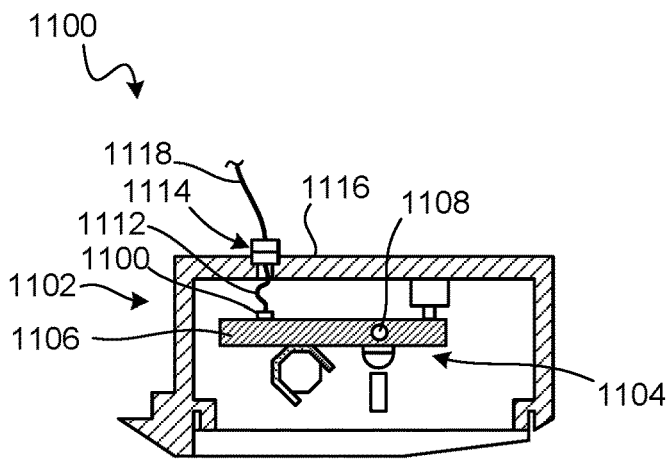
FIG. 11 is a partial cross-sectional side view of another example scanner device including an example wired connection.

FIG. 11 shows an example scanner device 1100. The device 1100 is similar to the other devices described herein and description of the other devices may be referenced. Like reference numerals denote like components. Features and aspects of the other devices described herein may be used with the device 1100. The scanner device 1100 may be a scan module, such as a CIS module.

The scanner device 1100 includes a sealed enclosure 1102 that contains a rotatably positionable optical assembly 1104. The optical assembly 1104 includes a substrate 1106, such as a PCB or PCBA, to which an image sensor, light source, rod lens array, and similar components may be connected. The optical assembly 1104 may be rotatably connected to the sealed enclosure 1102 by a pivot connection 1108. The substrate 1106 may include a terminal 1110 for receiving an internal wire connection 1112, such a ribbon cable, to communicate power and/or data with the optical assembly 1104. The internal wire connection 1112 may extend within the sealed enclosure 1102 from the optical assembly 1104 to a connector 1114 affixed to a wall 1116 of the sealed enclosure 1102. An external wire connection 1118, such as a ribbon cable, may be connected to the connector 1114 to communicate power and/or data with a component outside the sealed enclosure 1102. The external wire connection 1118 may be removably connected to the connector 1114. The internal wire connection 1112 may have a position and slack length sufficient to allow the optical assembly 1104 to rotate about the pivot connection 1108. As such, the internal wire connection 1112, the connector 1114, and the external wire connection 1118 may provide a flexible and removable electrical connection to the optical assembly 1104 over a range of rotation of the optical assembly 1104.

Figure 12:
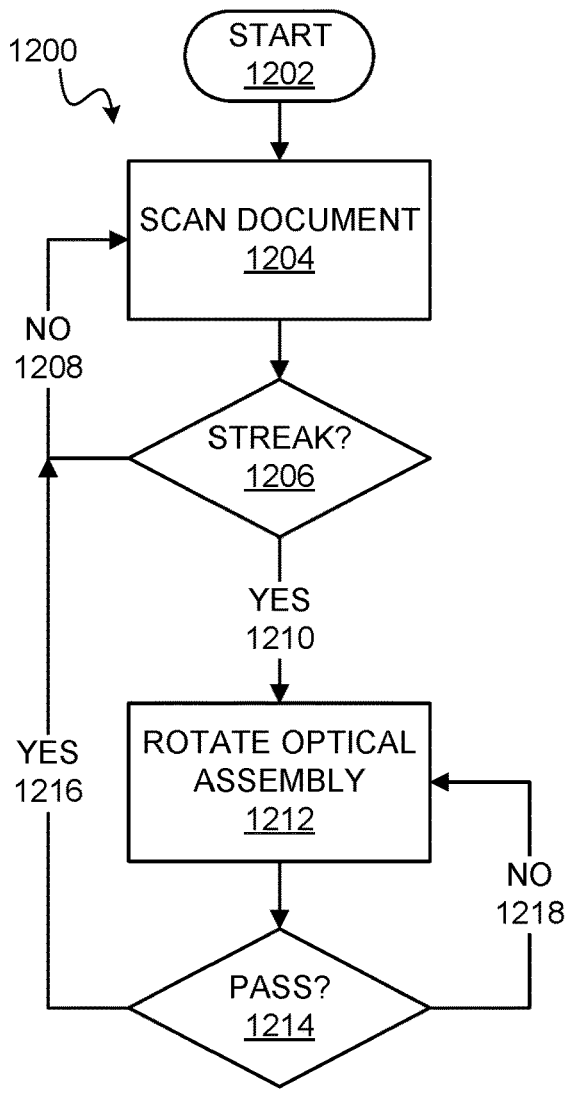
FIG. 12 is flowchart of an example method to operate a scanner device including detecting a streak and rotating an example optical assembly in response.

FIG. 12 shows a flowchart of an example method 1200. The method 1200 may be performed with any of the devices discussed herein. The method 1200 may be implemented by processor-executable instructions. The description of the other methods may be referenced for description not repeated here, with like reference numerals denoting like components. The method begins at block 1202.

At block 1204, a document page or other medium is scanned through a scan window using a rotatable optical assembly at a particular rotational orientation.

At block 1206, streak detection is performed on an image of the scanned document. A streak may be detected by image analysis performed by a processor, by an indication received from a user via a user interface, or similar. When a streak is not detected, the method returns to block 1204 via path 1208 to scan another document page or continue scanning a present document page. When a streak is detected, the method takes path 1210 to block 1212.

At block 1212, the optical assembly is rotated to a new orientation, as it is considered that foreign matter may have entered the scan light path. Light may be captured from a scan line of the new orientation, at block 1214, and a resulting signal may be compared to a reference signal or otherwise evaluated for an indication of streaking. For example, blocks 904-910 of FIG. 9 may be performed. When the signal from the new scan line passes the evaluation, the method returns to block 1204 via path 1216 to scan another document page, continue scanning a present document page, or re-scan the present document page. When the signal from the new scan line fails the evaluation, method may return to block 1212 via path 1218 to rotate the optical assembly to try another new orientation. Any number of attempts to rotate the optical assembly may be made to obtain an orientation and resulting scan line that lacks streaks. In no such orientation is found, the method 1200 may end and indicate an error to the user.

In view of the above it should be apparent that locating the optical assembly within a sealed enclosure reduces or eliminates the chance that dust, debris, particulate, or other foreign matter will directly affect internal optics to confound the corrective rotational functionality provided by rotation of the internal optics. Further, various actuators may be used to rotate the internal optics while maintaining the seal at the enclosure. Internal optics may be rotated a slight amount behind a sealed scan window, such that an optical length is not significantly affected.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A scanner device comprising:
   a sealed enclosure including a scan window to allow light to enter the sealed enclosure;
   an optical assembly including a light source and an image sensor, the light source to emit light through the scan window onto a medium to be scanned, the image sensor to capture light reflected by the medium through the scan window, the optical assembly rotatably positioned within the sealed enclosure; and
   an actuator disposed within the sealed enclosure to rotate the optical assembly to aim the optical assembly at different locations on the scan window.

2. The scanner device of claim 1, further comprising a calibration strip, the light source to emit light through the scan window onto the calibration strip absent the medium to be scanned, the image sensor to capture light reflected by the calibration strip through the scan window.

3. The scanner device of claim 2, further comprising a base and a calibration strip window, calibration strip window positioned opposite the scan window, the calibration strip sandwiched between the base and the calibration strip window.

4. The scanner device of claim 1, wherein the optical assembly is rotatable to aim at different locations at the medium no greater than 1 mm apart.

5. The scanner device of claim 1, further comprising a frame, wherein the sealed enclosure is affixed to the frame.

6. The scanner device of claim 1, wherein the optical assembly is fixed against translation with respect to the sealed enclosure.

7. The scanner device of claim 1, further comprising a drive device located outside the sealed enclosure, the drive device connected to the actuator to drive the actuator.

8. The scanner device of claim 1, further comprising a drive device located inside the sealed enclosure, the drive device connected to the actuator to drive the actuator.

9. The scanner device of claim 7, wherein the optical assembly is a contact image sensor (CIS).

10. A scanner device comprising:
    a sealed enclosure including a scan window to allow light to enter the sealed enclosure;
    an optical assembly including a light source and an image sensor, the light source to emit light along a light path that terminates at the image sensor, the light path to pass through the scan window and reflect from a medium to be scanned, wherein the optical assembly is rotatably actuatable within the sealed enclosure to aim the light path; and
    a processor coupled to the optical assembly, the processor to control the image sensor to aim the light path at a first location and to capture light from the light path through the scan window as a calibration signal, the processor to rotate the optical assembly to aim the light path at a second location to capture light from the light path through the scan window.

11. The scanner device of claim 10, wherein the processor is to compare the calibration signal to a reference signal, and the processor is to aim the light path at the second location in response to a determination that the calibration signal fails to accord with the reference signal.

12. The scanner device of claim 10, wherein the calibration signal is a first calibration signal, the processor is to aim the light path at the second location to determine a second calibration signal, and the processor is to calibrate the image sensor with reference to the first calibration signal and the second calibration signal.

13. The scanner device of claim 12, wherein the processor is to determine an average calibration signal that includes the first calibration signal and the second calibration signal to calibrate the image sensor.

14. A scanner device comprising:
    a sealed enclosure including a scan window to allow light to enter the sealed enclosure;
    a contact image sensor to illuminate a medium to be scanned through the scan window, the contact image sensor to capture light reflected by the medium through the scan window via a rod lens array, the contact image sensor rotatably positioned within the sealed enclosure;
    a calibration strip disposed outside the sealed enclosure; and
    an actuator to rotate the contact image sensor to aim the contact image sensor at different locations on the calibration strip to provide different scan lines at the calibration strip.

15. The scanner device of claim 14, further comprising a processor coupled to the contact image sensor, the processor to calibrate the contact image sensor based on light captured at the different scan lines on the calibration strip.

* * * * *